United States Patent
Lannoije et al.

(10) Patent No.: US 10,199,882 B2
(45) Date of Patent: Feb. 5, 2019

(54) OBJECT DETECTION SYSTEM AND METHOD FOR DETECTING FOREIGN OBJECTS IN AN INDUCTIVE POWER TRANSFER SYSTEM

(71) Applicant: Bombardier Primove GmbH, Berlin (DE)

(72) Inventors: Marnix Lannoije, Heidelberg (DE); Robert Czainski, Szczecin (PL); Christian Wirth, Winterthur (CH)

(73) Assignee: Bombardier Primove GmbH, Berlin (DE)

( * ) Notice: Subject to any disclaimer, the term of this patent is extended or adjusted under 35 U.S.C. 154(b) by 126 days.

(21) Appl. No.: 15/304,197

(22) PCT Filed: Mar. 31, 2015

(86) PCT No.: PCT/EP2015/056949
§ 371 (c)(1),
(2) Date: Oct. 14, 2016

(87) PCT Pub. No.: WO2015/158539
PCT Pub. Date: Oct. 22, 2015

(65) Prior Publication Data
US 2017/0040848 A1    Feb. 9, 2017

(30) Foreign Application Priority Data
Apr. 17, 2014    (GB) .................................. 1406950.4

(51) Int. Cl.
*H01M 10/46* (2006.01)
*H02J 50/60* (2016.01)
(Continued)

(52) U.S. Cl.
CPC ............. *H02J 50/60* (2016.02); *B60L 11/182* (2013.01); *B60L 11/1829* (2013.01);
(Continued)

(58) Field of Classification Search
CPC .......... H02J 7/355; H02J 7/0042; H02J 5/005; H02J 7/025
(Continued)

(56) References Cited

U.S. PATENT DOCUMENTS

| 5,029,300 A | 7/1991 | Ishibashi et al. |
| 9,442,172 B2 | 9/2016 | Verghese et al. |

(Continued)

FOREIGN PATENT DOCUMENTS

| DE | 102010016028 A1 | 9/2011 |
| GB | 2508923 A | 6/2014 |

(Continued)

OTHER PUBLICATIONS

J. A. McNeil, "The Metal Detector and Faraday's Law", The Physics Teacher, vol. 42, Sep. 1, 2004 (Sep. 1, 2004), pp. 8-12, XP055200151, Colorado School of Mines, Golden, CO.

*Primary Examiner* — Edward Tso
(74) *Attorney, Agent, or Firm* — The Webb Law Firm

(57) ABSTRACT

The invention relates to an object detection system for an inductive power transfer system, in particular for transferring power to a vehicle on a surface of a route, wherein the inductive power transfer system includes a primary winding structure and a secondary winding structure, wherein a charging volume is assigned to the inductive power transfer system during inductive power transfer, wherein the object detection system includes at least one sensing device, wherein the sensing device has a detection volume, wherein the at least one sensing device is arranged such that the detection volume is fully arranged outside the charging volume or includes only an edge portion of the charging volume. Furthermore, the invention relates to a method for detecting a foreign object, an inductive power transfer system and a vehicle.

21 Claims, 5 Drawing Sheets

(51) Int. Cl.
*B60L 11/18* (2006.01)
*H02J 7/02* (2016.01)
*H02J 50/10* (2016.01)
*H02J 50/90* (2016.01)

(52) U.S. Cl.
CPC ........... *B60L 11/1838* (2013.01); *H02J 7/025* (2013.01); *H02J 50/10* (2016.02); *H02J 50/90* (2016.02); *B60L 2200/18* (2013.01); *B60L 2240/80* (2013.01)

(58) Field of Classification Search
USPC ................................ 320/107, 108, 114, 115
See application file for complete search history.

(56) References Cited

U.S. PATENT DOCUMENTS

| | | | |
|---|---|---|---|
| 9,465,064 | B2 | 10/2016 | Roy et al. |
| 9,494,539 | B2 | 11/2016 | Butterworth et al. |
| 2008/0054905 | A1 | 3/2008 | Linse et al. |
| 2010/0270867 | A1 | 10/2010 | Abe |
| 2012/0200151 | A1 | 8/2012 | Obayashi et al. |
| 2012/0262002 | A1 | 10/2012 | Widmer et al. |
| 2013/0033224 | A1 | 2/2013 | Raedy |
| 2013/0307346 | A1 | 11/2013 | Arisawa et al. |
| 2014/0015329 | A1 | 1/2014 | Widmer et al. |
| 2014/0015522 | A1 | 1/2014 | Widmer et al. |
| 2014/0084857 | A1* | 3/2014 | Liu .......... H02J 5/005 320/108 |
| 2014/0092243 | A1 | 4/2014 | Ichikawa |
| 2015/0123609 | A1 | 5/2015 | Niizuma |
| 2015/0276965 | A1 | 10/2015 | Turki |
| 2015/0321567 | A1 | 11/2015 | Czainski |
| 2015/0380945 | A1* | 12/2015 | Krupezevic .......... H02J 5/005 320/108 |

FOREIGN PATENT DOCUMENTS

| | | |
|---|---|---|
| GB | 2510125 A | 7/2014 |
| JP | 201275200 A | 4/2012 |
| JP | 2013240235 A | 11/2013 |
| JP | 2013252039 A | 12/2013 |
| JP | 201423414 A | 2/2014 |
| JP | 2014039369 A | 2/2014 |
| WO | 2013036947 A2 | 3/2013 |
| WO | 2013120836 A1 | 8/2013 |
| WO | 2014011776 A2 | 1/2014 |
| WO | 2014027506 A1 | 2/2014 |
| WO | 2014041176 A2 | 3/2014 |
| WO | 2014063159 A2 | 4/2014 |

* cited by examiner

OBJECT DETECTION SYSTEM AND METHOD FOR DETECTING FOREIGN OBJECTS IN AN INDUCTIVE POWER TRANSFER SYSTEM

CROSS-REFERENCE TO RELATED APPLICATIONS

This application is the United States national phase of International Application No. PCT/EP2015/056949 filed Mar. 31, 2015, and claims priority to United Kingdom Patent Application No. 1406950.4 filed Apr. 17, 2014, the disclosures of which are hereby incorporated in their entirety by reference.

BACKGROUND OF THE INVENTION

Field of the Invention

The invention relates to an object detection system for an inductive power transfer system, in particular for transferring power to a vehicle on a surface of a route. Further, the invention relates to a method for detecting foreign objects within an inductive power transfer system. Further, the invention relates to an inductive power transfer system and a vehicle.

Description of Related Art

While travelling on a route vehicles require energy for driving (i.e. propulsion) and for auxiliary equipment which does not produce propulsion of the vehicle. Such auxiliary equipment includes, for example, lighting systems, heating and/or air-conditioning systems, ventilation and passenger information systems. Not only track-bound vehicles (such as trams), but also road automobiles can be operated using electric energy. If continuous electric contact between the travelling vehicle and an electric rail or wire along the route is not desired, electric energy can be either withdrawn from an on-board energy storage or can be received by induction from an arrangement of electric lines of the route.

The transfer of electric energy to the vehicle by induction forms a background of the invention. A route-sided conductor arrangement (primary winding structure) of a primary unit of the system for inductive power transfer produces an electromagnetic field. The field is received by a secondary winding structure integrated into a receiving device on board of the vehicle so that the field produces an electric voltage by induction. The transferred energy may be used for propulsion of the vehicle and/or for other purposes such as providing the auxiliary equipment of the vehicle with energy.

A problem in such devices is that it is generally not possible to mechanically prevent foreign objects, in particular objects made of metal, from being placed into proximity of the primary unit of an inductive power transfer system, in particular from being placed within the air gap between the primary and the secondary winding structure. Such foreign objects may e.g. comprise a coin, a can, a key, a tool and other objects. The varying magnetic field generated by the primary winding structure may induce current in the foreign objects made of metal and in other objects or fluids. Such currents may cause power losses and heating of the object. In particular metal objects which are placed in a charging space between a route-sided charging pad which comprises the primary winding structure and the receiving device can heat up during inductive power transfer. Heating of the foreign objects may be dangerous for e.g. persons trying to touch and remove the foreign object and/or may damage the surface the foreign object is placed on or parts of the primary unit. Also, a heated object can cause fire. It is, for instance, possible that metallized paper may catch fire. Such metallized paper or other light packaging waste may e.g. be blown into the space between the primary and the secondary winding structure, e.g. due to weather conditions.

It is desirable to have an inductive power transfer system for private or public transport vehicle which is reliable and safe under all foreseeable conditions. E.g., if a person or a child places a metal object in said charging space, it is desirable to automatically turn off or derate the inductive transfer system.

WO 2013/036947 A2 discloses a foreign object debris detection system for a wireless energy transfer system comprising at least one magnetic field sensor and at least one readout circuit to measuring electrical parameters of the at least one magnetic field sensor. The at least one magnetic field sensor is positioned within the magnetic field of the wireless energy transfer system.

GB 2508923 discloses a safety system for an inductive power transfer system for transferring power to a vehicle on a surface of a route. The document discloses that a detection winding can be part of a LC oscillating circuit.

US 2008/0054905 A1 discloses metal detectors including a sense coil coupled to an analog to digital converter that produces a numeric representation of an electrical signal associated with the conductive object situated in an active region of a sense coil. The document describes that an electric signal in an alternating current part of a LC oscillating circuit is used to detect a foreign object.

U.S. Pat. No. 5,029,300 discloses a sensor which comprises an oscillating circuit including an LC resonant circuit, wherein a detection signal is prohibited upon arrival of an external radio wave.

The postpublished WO 2014/063159 A2 disclosure features apparatus, methods, and systems for wireless power transfer that include a power source featuring at least one resonator, a power receiver featuring at least one resonator, a first detector featuring one or more loops of conductive material and configured to generate an electrical signal based on a magnetic field between the power source and the power receiver, a second detector featuring conductive material, and control electronics coupled to the first and second detectors, where during operation, the control electronics are configured to measure the electrical signal of the first detector and compare the measured electrical signal of the first detector to baseline electrical information for the first detector to determine information about whether debris is positioned between the power source and the power receiver.

JP2014-39369 discloses a transmission device which comprises: a primary coil for transmitting power in a non-contact state with a power receiving part including a secondary coil provided in a vehicle; at least one detection coil provided around the primary coil; a resonance circuit connected to the detection coils; and processing sections connected to the resonance circuit to determine whether an object is detected on the basis of output from the resonance circuit. The detection coils are formed by winding a detection coil wire so as to surround the periphery of a detection axis, and the detection axis is arranged to be inclined from a vertical direction.

SUMMARY OF THE INVENTION

It is a main idea of the invention to provide an object detection system for an inductive power transfer system which comprises a line sensor which provides a curtain-like detection volume wherein the detection volume can be used for scanning a charging volume and/or for detecting foreign objects entering a charging volume.

The present invention can be applied in particular to the field of energy transfer to any land vehicle, e.g. track bound vehicles such as rail vehicles (e.g. trams), but in particular to road automobiles, such as individual (private) passenger cars or public transport vehicles (e.g. busses).

An objection detection system for an inductive power transfer system, in particular for transferring power to a vehicle on a surface of a route, is proposed. The inductive power transfer system comprises a primary winding structure for generating an alternating electromagnetic field. Further, the power transfer system comprises a secondary winding structure for receiving said alternating electromagnetic field. The electromagnetic field generated by the primary winding structure or a superposition of the electromagnetic field generated by the primary winding structure and another alternating electromagnetic field generated by the secondary winding structure during reception of the first electromagnetic field can be referred to as power transfer field.

A charging volume is assigned to the inductive power transfer system. The charging volume can denote the volume which is filled with at least a portion of the magnetic part of the electromagnetic field generated by the primary winding structure or by the aforementioned power transfer field. The charging volume can e.g. denote the volume which is filled with at least 80%, 90% or 95% or even 100% of the electromagnetic field. In particular, the field volume can comprise all field lines of the electromagnetic field or at least a predetermined percentage, e.g. 80%, 90% or 95% of the field lines. In this context, the term comprises means that field lines of the magnetic part of the electromagnetic field which is comprised by the charging volume do not extend outside the charging volume.

The charging volume can also be a cylindrical volume.

A base area of the cylindrical volume corresponds to an envelope of the primary winding structure or an envelope of the primary unit and wherein the volume extends in a vertical direction (which will be explained later), e.g. with a predetermined height. A base area of the cylindrical volume can alternatively be a rectangular area which comprises the primary winding structure or an envelope of the primary unit and wherein the volume extends in the vertical direction (which will be explained later), e.g. with a predetermined height.

In particular, the charging volume can be assigned to the inductive power transfer system during inductive power transfer. This means that the charging volume is provided in a charging state, i.e. if power is transferred from the primary side to the secondary side.

This can e.g. be only the case if a relative position and/or relative orientation between the primary winding structure and the secondary winding structure is within a predetermined, desired position interval and/or orientation interval. In other words, the charging volume can be defined in an aligned state of the primary and the secondary winding structure.

In the context of this invention, the following primary-sided reference coordinate system will be defined. A first axis, which can be a vertical axis, is oriented parallel to a main direction of propagation of the alternating electromagnetic field generated by the primary winding structure. In particular, the first axis can be oriented orthogonal to a plane surface of the route or a charging pad installed on the route. A second axis, which can be a longitudinal axis, is oriented parallel to a longitudinal axis of the primary winding structure. This longitudinal axis can e.g. be parallel to a direction of extension of electric lines providing a primary winding structure. A third axis, which can be a lateral axis, is oriented or orthogonal to the first axis and the second axis.

A secondary-sided reference coordinate system can comprise a second axis, which can be a longitudinal axis, which can be oriented parallel to a longitudinal axis of the secondary winding structure, e.g. a main direction of extension of electric lines providing the secondary winding structure.

A first axis of the secondary-sided reference coordinate system, which can be a vertical axis, can be oriented or orthogonal to a plane comprising a secondary winding structure or a bottom surface of the secondary winding structure. A third axis of the secondary-sided reference coordinate system, which can be a lateral axis, can be oriented or orthogonal to the second and first axis. If a secondary winding structure is installed on a vehicle, the second axis can correspond to a roll axis of the vehicle, the first axis can correspond to a yaw axis, and the third axis can correspond to a pitch axis of the vehicle. The second axis can be oriented into a direction of travel of a vehicle if the vehicle travels straightforward.

In an ideal aligned state, the corresponding axes of the primary-sided reference coordinate system and the secondary-sided reference coordinate system can be oriented parallel to each other. In the following, directional terms such as under, above, ahead, behind, beside can relate to these reference coordinate systems.

In an aligned state, a reference point of the primary winding structure, e.g. a geometric center of primary winding structure, is displaced to a reference point of the secondary winding structure, e.g. a geometric center of the secondary winding structure, with displacements along the first, the second and the third axis, wherein said displacements are within predetermined desired displacements intervals, respectively. It is for instance possible that in a desired aligned state, the displacement along the second and the third axis is zero and the displacement along the first axis corresponds to a predetermined value, e.g. a desired height of an air gap. Thus, the aligned state can comprise multiple relative positions and/or relative orientations between the primary and the secondary winding structure.

Further, the object detection system comprises at least one sensing device. The sensing device is a device for detecting foreign objects, in particular metal objects.

The sensing device has a detection volume. Preferably, the at least one sensing device is a line sensing device, wherein the line sensing device has a curtain-like detection volume. In particular, the at least one line sensing device and its detection volume can be arranged such that in a section plane perpendicular to the aforementioned first direction, a maximal width of the detection volume is always higher than a maximal length of the detection volume or vice versa. In the context of this invention, the width is measured along the third axis, wherein the length is measured along the second axis.

It is preferred that the at least one sensing device is designed for detecting metal objects. However, the invention is not restricted to detect only metal objects. It is also possible to provide a sensing device for detecting other than metal objects.

Further, the at least one sensing device is arranged such that the detection volume is fully arranged outside the charging volume, in particular in the previously explained aligned state. This means that there is no overlapping portion between the aforementioned charging volume and the detection volume, in particular in the previously explained aligned state. As will be explained later in more detail, this feature can be equivalent to the feature or comprise the feature that the at least one sensing device can be arranged ahead of or beside and or behind the primary winding structure and/or the secondary winding structure, wherein the term "ahead" relates to the aforementioned second axis and a second direction. The second, e.g. longitudinal, direction can e.g. correspond to the direction of travel if the vehicle travels straight forward.

Alternatively, the at least one sensing device is arranged such that the detection volume comprises only an edge portion of the charging volume. In this case, there is an overlapping portion of the charging volume and the detection volume. However, the overlapping portion is arranged at an edge or extends along an edge of the charging volume. It is important that the detection volume does not cover the total charging volume or an inner portion of the charging volume. In this context, an edge portion can denote a portion which located at an edge of the charging volume and extends into the charging volume only by a predetermined amount, e.g. an amount smaller than 20%, 10% or even 5% of a distance from the edge to the center of the charging volume.

This feature can be equivalent to the feature or comprise the feature that the at least one sensing device can be arranged at or under or above an edge region, e.g. a front edge region a rear edge region or a lateral edge region, of the primary and/or secondary winding structure or an edge region of an area or envelope comprising the primary and/or secondary winding structure.

In all cases, the at least one sensing device is arranged such that a foreign object with a predetermined size, e.g. a small coin, cannot enter the charging volume without being detected by the at least one sensing device if the foreign object is moved into the charging volume from one or multiple direction(s), in particular from a direction in which the sensing device is arranged relative to the charging volume.

The sensing device can be arranged on the primary side. Alternatively, the at least one sensing device may be arranged on the secondary side, e.g. on the vehicle. In this case, the detection volume extends from secondary side towards the primary side.

The proposed objection detection system advantageously allows the detection of foreign objects before entering the charging volume. In contrast to surface detection means assigned to the primary side, foreign objects are not only detected if already located within the charging volume, but at or before the moment of entering said charging volume. Thus, the inductive power transfer can be terminated or derated if a foreign object entering the charging volume is detected. This, in terms, increases functional safety of the inductive power transfer.

It is of course possible that the at least one sensing device is arranged such that the detection volume is fully arranged outside a safety volume, wherein the safety volume is larger than the charging volume and comprises or encloses the charging volume.

According to the invention, the at least one sensing device comprises at least one exciting winding structure and at least one detecting winding structure. The exciting winding structure can generate an electromagnetic detection field. The at least one detecting winding structure can receive said detection field. The exciting winding structure can e.g. be designed as an exciter coil with a first number of turns. The at least one detecting winding structure can e.g. be designed as a detection coil with a second number of turns. The first number of turns and the second number of turns can be different or equal.

Preferably, the at least one sensing device comprises at least two or even more, e.g. four or six, detecting winding structures. The number of turns of the detecting winding structures can be equal or different.

The at least one detecting winding structure, in the case of more than one detecting winding structure all detecting winding structures, is/are arranged within the exciting winding structure(s). This means, that in a common plane of projection, the exciting winding structure(s) enclose(s) all detecting winding structures.

The common plane of projection can be a plane which is oriented orthogonal to a central axis of symmetry of a detecting winding structure and/or an exciting winding structure, wherein the respective winding structure is arranged around the axis of symmetry.

It is possible that the sensing device comprises more than one exciting winding structure. In this case, the at least one detecting winding structure, in the case of more than one detecting winding structure all detecting winding structures, is/are arranged within the area enclosed by the exciting winding structures. It is possible that all exciting winding structures cover or enclose parts of the detecting winding structure(s) with the same size (symmetrical enclosure). Alternatively, it is possible that all or some exciting winding structures cover or enclose parts of the detecting winding structure(s) with different sizes (unsymmetrical enclosure). Further, it is possible that one exciting winding structure covers or encloses exactly one or exactly a predetermined number of detecting winding structures or only a part thereof.

In particular, a maximum width of the exciting winding structure can be higher than a maximum length of the exciting winding structure or vice versa. Moreover, a maximum width and a maximum length of the exciting winding structure can be higher than a maximum width and maximum length of one detecting winding structure.

The exciting winding structure and the at least one detecting winding structure can have a predetermined geometric shape, e.g. a rectangular shape. Also, the exciting winding structure and/or the detecting winding structure can have a circular or part-circular shape.

The exciting winding structure and the at least one detecting winding structure can be arranged in different layers, e.g. in different height levels, wherein the height can be measured along the aforementioned first direction. If there is more than one detecting winding structure, these detecting winding structures can also be arranged in different layers and/or arranged such that at least two detecting winding structures overlap at least partially.

The at least one exciting winding structure and/or the at least one detecting winding structure can be arranged one a common circuit board.

In particular, one or more detecting winding structure can be partially or, preferably, fully arranged within an area enclosed by an exciting winding structure or within an area enclosed by more than one exciting winding structure. Thus, the detecting winding structure can be referred to as inner detecting winding structure, whereas the exciting winding structure can be referred to as outer exciting winding structure. If the exciting winding structure and the at least one detecting winding structure are arranged in different layers, one or more detecting winding structure can be partially or, preferably, fully arranged within an area enclosed by an exciting winding structure within a common plane of projection, wherein the common plane of projection can be oriented parallel to the area enclosed by the exciting winding structure or comprise said area.

The exciting winding structure can be operated with an alternating current (AC current). The AC current can have changing frequency and/or can have more than one frequency. It is possible that the AC current comprises one or multiple signal part(s) with predetermined frequencies or within a predetermined frequency interval. The frequencies can have a predetermined spectral distance relative to each other. The frequencies or frequency interval can be lower than a minimal frequency of a power transfer frequency interval or higher than a maximal frequency of a power transfer frequency interval, wherein the power transfer frequency interval comprises the frequency/frequencies of the power transfer field. The detection field which is generated by the exciting winding structure if the said AC current is applied to the exciting winding structure. The detection field is received by the at least one detecting winding structure, wherein an induced voltage is generated by the at least one detecting winding structure. Depending on at least one characteristic, in particular a time-related characteristic, of the induced voltage, in particular of a time course of an amplitude and/or a time course of a phase of the induced voltage, a foreign object, in particular a foreign metal object, within the detection volume can be detected.

The proposed arrangement of the at least one exciting winding structure and the at least one detecting winding structure advantageously allows a very sensitive detection of foreign metal objects.

In a preferred embodiment, the at least one sensing device is designed as an inductive sensing system. An inductive sensing system advantageously allows detecting metal objects with a high sensitivity.

In another embodiment, the at least one sensing device is arranged ahead of the charging volume or at a front edge region of the charging volume, in particular in the aforementioned aligned state. The term "ahead" relates to the second, e.g. longitudinal, direction.

This feature is equivalent to the feature that, if the at least one sensing device is arranged on the secondary side, the at least one sensing device can be arranged ahead of the secondary winding structure. Alternatively, the at least one sensing device can be arranged at/under/above a front edge region of the secondary winding structure. If the at least one sensing device is arranged on the primary side, the at least one sensing device can be arranged ahead of the primary winding structure. Alternatively, the at least one sensing device can be arranged at/under/above a front edge region of the primary winding structure.

In particular, the at least one sensing device can be arranged ahead of an edge of the charging volume or secondary winding structure or primary winding structure with a predetermined distance along the second direction.

Such an arrangement advantageously allows scanning the charging volume if the secondary winding structure is moved relative to the primary winding structure in the second direction, e.g. if a vehicle comprising the sensing device travels in forward direction along the longitudinal direction over the primary winding structure.

If the sensing device is arranged ahead of the charging volume, the corresponding detection volume can have a width which is larger than a width of the charging volume or the secondary winding structure or the primary winding structure, in particular in a common plane of protection which can be oriented perpendicular to the first, e.g. vertical, direction.

It is also possible that the width of the detection volume is larger than a predetermined percentage of the width of the charging volume or the secondary winding structure or the primary winding structure in the common plane of projection, e.g. larger than 80%, 90% or even 95%. Moreover, the detection volume can extend along the third, e.g. lateral, direction which means that if the sensing device is arranged ahead of the charging volume, the maximal width can be higher than the maximal length of the detection volume.

Moreover, the at least one sensing device can be arranged ahead of the charging volume such that a geometric center of the primary winding structure and/or a geometric center of the secondary winding structure and a geometric center of the sensing device, e.g. a geometric center of the at least one exciting winding structure, are arranged on a common line which is parallel to the second direction.

Also, a maximal with of the detection volume in a plane comprising a charging surface can be larger than at least 50%, preferably larger than 90% or 100%, of the maximal width of the charging volume in said plane. In other words, the maximal width of the detection volume in the said plane can also be larger than at least 50%, preferably larger than 90% or 100%, of the maximal width of the primary winding structure and/or the secondary winding structure. The charging surface can be defined by a projection of the charging volume onto the surface of the route or an upper surface of a charging pad along the first direction. Moreover, the at least one sensing device can be arranged such that, with respect the third direction, the detection volume comprises at least a portion of the, preferably the total, charging volume, or primary winding structure or secondary winding structure in a common plane of protection which can be oriented perpendicular to the second direction.

In another embodiment the object detection system comprises at least another sensing device, in particular at least one other sensing device, wherein the at least one other sensing device is arranged beside the charging volume or at a lateral edge region of the charging volume. This feature can be equivalent to the feature that the at least one other sensing device can be arranged beside the primary winding structure and/or the secondary winding structure. It is possible that the at least one other sensing device can be arranged at/under/above a lateral edge region of the primary and/or secondary winding structure.

The at least one other sensing device can be arranged beside an edge of the charging volume or the primary winding structure or the secondary winding structure with a predetermined distance along the third, e.g. lateral, direction. This advantageously allows compensating for a lateral parking tolerance.

In this case, a detection volume of the at least one other sensing device can extend along the second direction which means that a maximal length of the detection volume is always higher than a maximal width of the detection volume.

Moreover, a maximal length of the detection volume in a plane comprising the charging surface can be larger than at least 50%, 80%, 90% or even larger than 100% of the maximal length of the charging volume or the primary winding structure or the secondary winding structure in said charging surface.

Of course, the at least one object detection system can comprise more than one sensing device which is arranged beside the charging volume.

Alternatively, the at least one other sensing device is arranged behind the charging volume, in particular with a predetermined distance from an edge of the charging volume or the secondary winding structure or the primary winding structure against the second, e.g. longitudinal, direction. However, said distance can be smaller than the distance between the sensing device which is arranged ahead of the charging volume and the edge of the charging volume or primary winding structure or secondary winding structure. Also, the at least one other sensing device can be arranged at a rear edge region of the charging volume. In this case, the at least one other sensing device can be arranged at/under/above a rear edge region of the primary and/or secondary winding structure.

Such a sensing device can be designed similar to the aforementioned sensing device which is arranged ahead of the charging volume. The at least one other sensing device can be arranged on the secondary side or on the primary side.

The at least one other sensing device can be installed with a fixed height, in particular if arranged on the secondary side. It is also possible to arrange the other sensing device on the receiving device. In the case where a position of the receiving device, in particular along the first direction, can be adjusted, also the position of the other sensing device can be adjusted.

By providing one or more additional sensing device(s) with the previously explained arrangement, the charging volume can be at least partially, preferably fully, enclosed by detection volumes of sensing devices. These sensing devices can provide curtain-like detection volumes around the charging volume. This, in turn, allows a very reliable detection of a foreign object entering the charging volume independent of the direction of entry.

In another embodiment, at least one barrier device is arranged beside the charging volume and/or behind the charging volume. This embodiment can provide subject-matter of an independent invention. This subject-matter can be further designed according to one or more aspects provided in the claims and the description. The barrier device provides an element for mechanically blocking objects from entering the charging volume. The at least one barrier device can extend along the second direction if arranged beside the charging volume. If arranged behind the charging volume, the at least one barrier device can extend along the third direction. The at least one barrier device can have a predetermined height which can e.g. be equal to or greater than a distance from the secondary winding structure or receiving device to the primary winding structure in the aforementioned aligned state. Preferably, the at least one barrier device is made of a flexible material, e.g. rubber or plastic. One or more barrier devices can be arranged such as foreign objects are physically prevented from entering the charging volume from side or from behind.

The at least one barrier device can be arranged on the primary side or, preferably, on the secondary side.

In another embodiment the at least one sensing device and/or the at least one other sensing device is/are arranged on a secondary side of the inductive power transfer system. In particular, the sensing device(s) can be arranged on the vehicle, in particular on a bottom side of the vehicle. The sensing device(s) can be arranged at a predetermined, fixed height above a surface of a route. Alternatively, the at least one sensing device and/or the at least other sensing device can be arranged in a variable height. In particular, the at least one other sensing device can be attached to the receiving device of the vehicle.

In an alternative embodiment, the at least one sensing device and/or the at least one other sensing device is/are arranged on a primary side of the inductive power system. In particular, the sensing device(s) can be arranged on a surface of the route or on a surface of a charging pad. In particular, the at least one other sensing device can be attached to a primary unit or a charging pad comprising the primary winding structure.

In another embodiment, the object detection system comprises at least one positioning means for adapting a position of the at least one sensing device and/or at least one other sensing device. In particular, the positioning means is designed such that a vertical position of the at least one sensing device and/or the at least one other sensing device can be adjusted, in particular a height above a surface of the route or the charging pad. It is, of course, also possible that a longitudinal and/or lateral position of the at least one sensing device can be adjusted by the at least one positioning means. This embodiment can provide subject-matter of an independent invention. This subject-matter can be further designed according to one or more aspects provided in the claims and the description.

Of course, the object detection system can comprise multiple positioning means, for example one positioning means for each sensing device. The positioning means, in particular of the sensing device(s) arranged beside and/or behind the charging volume, can be provided by a lifting device of the receiving device, wherein the lifting device allows adjusting a position of the receiving device and the secondary winding structure. Preferably, a positioning means of a sensing device ahead of the charging volume, however, is designed independent of a lifting device of the receiving device.

In another embodiment, the object detection system comprises at least evaluation unit. By means of the at least one evaluation unit, at least one signal characteristic of an output signal of the at least one sensing device is determinable. A signal characteristic can e.g. be a time characteristic but also another signal characteristic. At least one characteristic of a detected object is determinable depending on the at least one signal characteristic.

In particular, a frequency and/or an amplitude and/or a phase of the output signal can be determined. More particular, a frequency change and/or an amplitude change and/or a phase can be determined. The change can be a change in time. Alternatively, the change can be a change relative to a reference signal can be determined. The reference signal can be signal by which the exciting winding structure is operated. Alternatively, the reference signal can be an ideal output signal which is generated in a scenario in which no foreign object is present.

It has been found that a phase change and/or an amplitude change is related to a geometry or size of a foreign object. Hence, a geometry or size of a foreign object can be determined depending on a phase change and/or an amplitude change.

Moreover, it has been found that a frequency or frequency change is related to a penetration depth of the detection field in a foreign object. The penetration depth is related to a material of the foreign object. Hence, a material of the foreign object can be determined depending on a frequency or frequency change.

A characteristic of the detected object can e.g. be a size, a volume, a shape, a material or a type of the detected object. A characteristic can also be a location of the detected object relative to the sensing device. If the sensing device comprises more than one detecting winding structure, the output signal of each detecting winding signal can be evaluated. This enhances in particular the determination of the aforementioned location.

Depending on the at least one characteristic of the detected object, a control of the inductive power transfer can be performed. It is, for instance, possible to not terminate or derate an inductive power transfer process if the detected object is smaller than a predetermined size and/or is made of a predetermined material. Also, adequate measures to remove the foreign object can be initiated depending on the at least one characteristic, e.g. an automated cleaning of the charging volume.

Further proposed is a method for detecting a foreign object, in particular a foreign metal object. An inductive power transfer system, in particular for transferring power to a vehicle on a surface of a route, comprises a primary winding structure and a secondary winding structure, wherein a charging volume is assigned to the inductive power transfer system. An object detection system comprises at least one sensing device, wherein the at least one sensing device has a detection volume.

Further, the at least one sensing device is arranged such that the detection volume is fully arranged outside the charging volume or comprises only an edge portion of the charging volume.

Thus, the method can be conducted or performed by using an object detection system according to one of the previously described embodiments. In turn, the proposed object detection system can be designed such that a method according to one of the proposed embodiments can be performed by said object detection system.

In particular, the at least one sensing device can comprise at least one exciting winding structure and at least one detecting winding structure, wherein the at least one detecting winding structure is arranged within the exciting winding structure. This has been explained previously.

The at least one sensing device is activated before and/or during an inductive power transfer. The at least one sensing device can e.g. be activated by applying an AC current with a predetermined time course to the aforementioned exciting winding structure. As mentioned before, the AC current can feature more than one frequency at one point in time and/or along a time course of the AC current. In particular, at least one frequency of the AC current can change along the time course. Further the detection field generated by the exciting winding structure can be received by the at least one detecting winding structure. A resulting time course of the induced voltage can be analyzed, e.g. by a corresponding evaluation unit. Depending on at least one characteristic of the induced voltage, a foreign object within the detection volume can be detected. This advantageously provides a method for detecting a foreign object entering a charging volume from one or more, in particular all, possible direction(s) of entry.

In another embodiment, the at least one sensing device is activated during an alignment operation of the secondary winding structure relative to the primary winding structure. An alignment operation denotes an operation which is performed in order to provide the aforementioned aligned state. The at least one sensing device can e.g. be activated if the secondary winding structure approaches the primary winding structure, in particular if a vehicle to which the secondary winding structure and the at least one sensing device is attached approaches the route-sided primary winding structure, which is e.g. integrated into a charging pad. In particular, the at least one sensing device can be activated before the at least one sensing device is positioned over an active area assigned to the primary winding structure. The active area can be defined as an area of the surface of the route, wherein at least a predetermined portion, preferably all, field lines of the alternating electromagnetic field generated by the primary winding structure or the power transfer field extend through the active area. The active area can correspond to the aforementioned charging surface. The active area can also enclose a cross section of the aforementioned charging volume, wherein the section plane is provided by the surface of the route or the charging pad. However, the at least one sensing device can also be activated before or at the point in time at which the at least on sensing device is positioned over an active zone wherein the active zone comprises the aforementioned active area but also neighboring areas. The proposed embodiment particularly applies to an object detection system, wherein the at least one sensing device is arranged on the secondary side, in particular on a vehicle.

The activation can be continued for the whole alignment operation, e.g. until the secondary winding structure is aligned relative to the primary winding structure allowing inductive power transfer. This embodiment advantageously allows scanning the active area before inductive power transfer is performed. Thus, if a vehicle moves over a primary winding structure, foreign objects located within a (future) charging volume, can be reliably detected. In the scenario, the curtain-like detection volume is moved across the future charging volume, in particular across the active area.

The at least one sensing device can in particular be arranged such that a desired active zone, in particular the total active area, is scanned before a desired aligned state between primary and the secondary winding structure is achieved.

In another embodiment, the at least one sensing device is arranged ahead of the charging volume or at a front edge region of the charging volume, in particular ahead of or at/under/above a front edge region of the secondary winding structure, and is activated before and during the secondary winding structure is moved over the primary winding structure in a predetermined, e.g. longitudinal, direction. During this movement, the at least one sensing device will be moved over the active area before a desired aligned state is reached. Correspondingly, a sensing device which is arranged behind the charging volume, in particular behind the secondary winding structure, can be activated before and during the secondary winding structure is moved over the primary winding structure against the second direction, e.g. if the vehicle moves backwards. In general, sensing devices can be activated depending on a direction of movement of the secondary winding structure relative to the primary winding structure during the alignment operation.

In another embodiment, the at least one sensing device arranged ahead of the charging volume or at a front edge region of the charging volume and/or the at least one other sensing device arranged beside or behind the charging volume or at a lateral edge region or at a rear edge region is activated after the secondary winding structure is aligned relative to the primary windings structure and before and/or during an inductive power transfer, e.g. after the aligned state is reached. It is for instance possible, that the activated sensing device during the relative movement during the alignment operation continues to be activated. Additionally, sensing devices being deactivated during the alignment operation can be activated after the alignment operation has finished and before and during an inductive power transfer. This advantageously allows detecting a foreign object entering the charging volume before and/or during power transfer process.

In another embodiment, a position, in particular a vertical position, of the at least one sensing device is adjusted. In particular, the at least one sensing device can be moved towards the surface of the route before the beginning of an alignment operation. An alignment operation can e.g. start if the secondary winding structure enters a predetermined volume around the primary winding structure. This can e.g. be detected using positioning sensors and/or object detecting means. After an end of the alignment operation or an end of the inductive power transfer, the at least one sensing device can e.g. be moved away from the surface of the route, in particular along the vertical direction. This embodiment can provide subject-matter of an independent invention. This subject-matter can be further designed according to one or more aspects provided in the claims and the description.

In a preferred embodiment, a detection signal is generated if a foreign object is detected by the at least one sensing device. The foreign object can be detected during the relative movement of the secondary winding structure and the primary winding structure or before and during the inductive power transfer, wherein the secondary winding structure is aligned relative to the primary winding structure.

The inductive power transfer process is controlled depending on the detection signal. For instance, an ongoing inductive power transfer process can be terminated or derated if a foreign object is detected. Also, a planned inductive power transfer is disabled if a foreign object is detected. This e.g. means that an inductive power transfer process cannot be started.

In another embodiment, at least one signal characteristic of an output signal of the at least one sensing device is determined, wherein at least one characteristic of a detected object is determined depending on the at least one signal characteristic. This has be described previously. The inductive power transfer process can thus be additionally controlled depending on the at least one signal characteristic.

Further proposed is an inductive power transfer system, wherein the inductive power transfer system comprises an object detection system according to one of the previously explained embodiments or embodiments described in this invention.

Further proposed is a vehicle, wherein the vehicle comprises an object detection system according to one of the previously explained embodiments or embodiments described in this invention.

Further described is a method of manufacturing an object detection system, in particular for transferring power to a vehicle on a surface of a route. The method comprises the steps of providing at least a part of an inductive power transfer system, in particular a primary winding structure and/or secondary winding structure,
providing at least one sensing device and
arranging the at least one sensing device such that a detection volume of the at least one sensing device is fully arranged outside a charging volume assigned to the inductive power transfer system or comprises only an edge portion of said charging volume.

BRIEF DESCRIPTION OF THE DRAWINGS

The invention will be described with reference to the attached figures. The figures show.

DETAILED DESCRIPTION OF THE INVENTION

Figure 1:
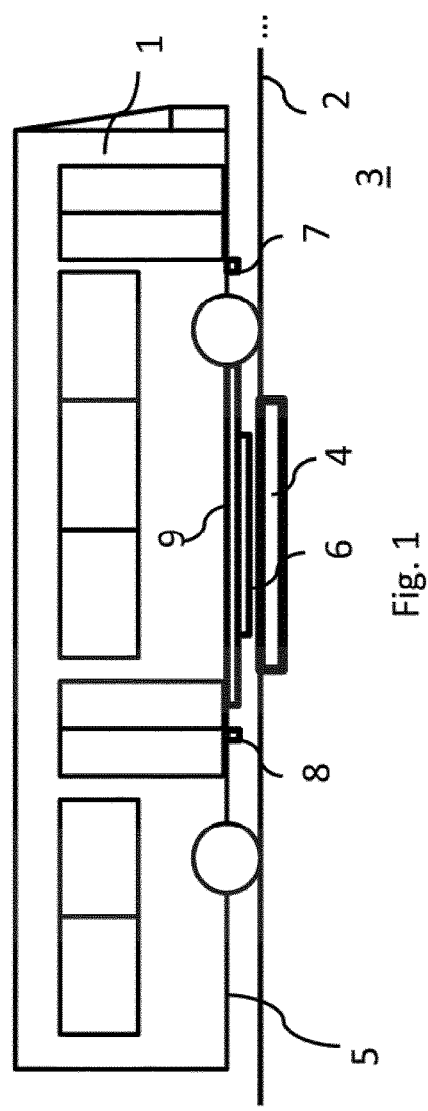
FIG. 1 a schematic side view of a vehicle, and inductive power transfer system and an object detection system,
FIG. 2 a closed view of the object detection system shown in FIG. 1,
FIG. 3 a front view of the vehicle, the inductive power transfer system and the object detection systems shown in FIG. 1,
FIG. 4 a closed view of the object detection system shown in FIG. 3,
FIG. 5 a bottom view of the vehicle, the inductive power transfer system and the object detection system shown in FIG. 1
FIG. 6 a schematic block diagram of a sensing device,
FIG. 7 a front view of another vehicle, an inductive power transfer system and an object detection system,
FIG. 8 a bottom view of the vehicle shown in FIG. 7, and
FIG. 9 a schematic side view of another vehicle, and inductive power transfer system and an object detection system.

FIG. 1 shows a schematic side view of a vehicle 1 on a surface 2 of a route 3. A primary unit 4 which can be designed as a charging pad and which comprises a primary winding structure (not shown) is arranged within the route 3. Attached to a bottom side 5 of the vehicle 1 is a secondary-sided receiving unit 6 which comprises a secondary winding structure (not shown).

An object detection system comprises a front detector 7, a rear detector 8 and side detectors 9 for detecting objects, in particular metal objects. The detectors 7, 8, 9 are designed as line sensing devices which have curtain-like detection volume 10 (see FIG. 2).

In FIG. 1, the primary winding structure and the secondary winding structure are arranged in an aligned state. Within this aligned state, a charging volume CV (see FIG. 2) is assigned to the inductive power transfer system.

Figure 2:
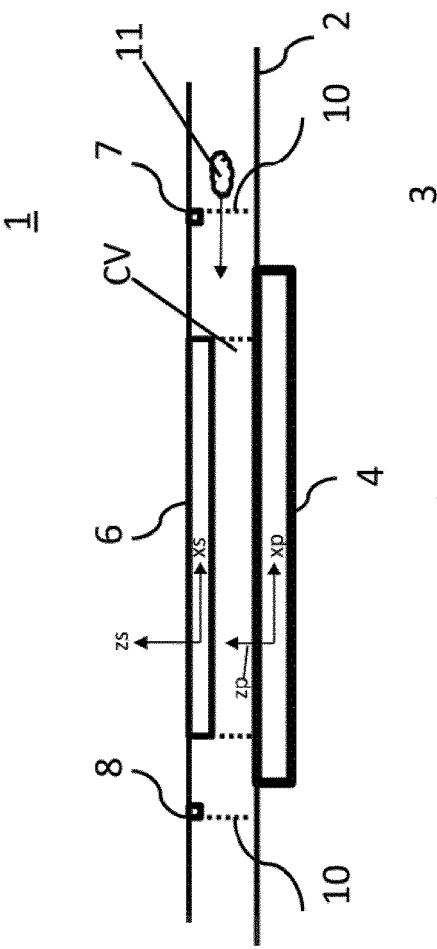

In FIG. 2 is shown that the front detector 7 is arranged ahead of the charging volume CV, ahead of the primary unit 1 and ahead of the receiving device 2. In the context of this invention, the term "ahead" relates to a longitudinal direction xs in a secondary-sided reference coordinate system of the vehicle 1 or a longitudinal direction xp in a primary-sided reference coordinate system of the primary unit 4. A geometric center of the secondary winding structure provides an origin of the secondary-sided reference coordinate system. Further shown are vertical axes zp, zs of the reference coordinate systems. The vertical axes zp, zs are oriented from bottom to top. With reference to these coordinate systems, an aligned state of the primary and the secondary winding structure is provided if a distance between the origins along the vertical axes zp, zs corresponds to a desired air gap between the primary unit 4 and the receiving device 6. Distances between the origins along the longitudinal axes xp, xs and the lateral axes yp, ys are within a predetermined distance interval which comprises a distance of zero. The rear detector 8 is arranged behind the charging volume CV with respect to the longitudinal direction xs of the secondary-sided reference coordinate system. Further, the rear detector 8 is also arranged behind the receiving device 6 and the primary unit 4 in the aligned state.

In FIG. 2, detection volumes 10 of the front and the rear detectors 7, 8 are shown. These detection volumes 10 extend from the vehicle 1 to the surface 2 of the route 3. It is shown that the front and the rear detectors 7, 8 are arranged such that the detection volumes 10 are fully arranged outside the charging volume CV. The detection volumes 10 can also be denoted as safety curtains which extend between chassis of the vehicle 1 and the surface 2.

Further shown is a safety critical metal object 11. Indicated is a direction of movement of the metal object 11 which moves towards the charging volume CV. It is shown the metal object 11 will pass the detection volume 10 of the front detector 7. Thus, the incoming metal object 11 can be detected by the front detector 7. If the metal object 11 is detected, a charging control system which controls the inductive power transfer can be informed, e.g. by a detection signal. As a result, an ongoing inductive power transfer may be terminated or derated or an intended inductive power transfer cannot be approved.

Figure 3:
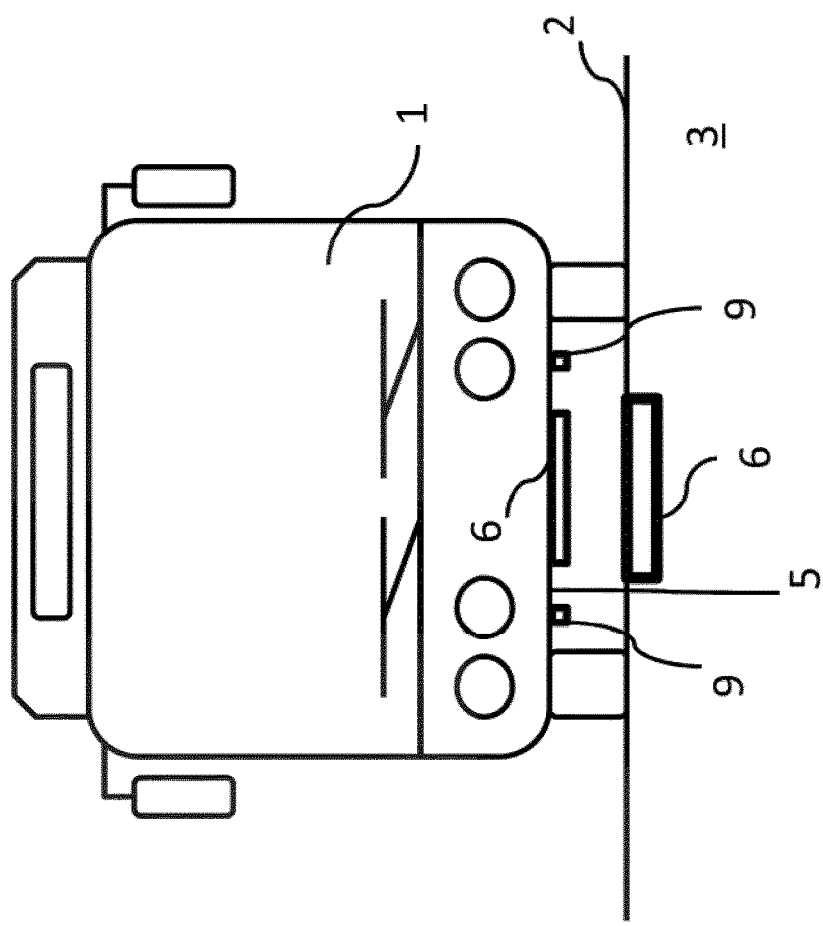
Figure 4:
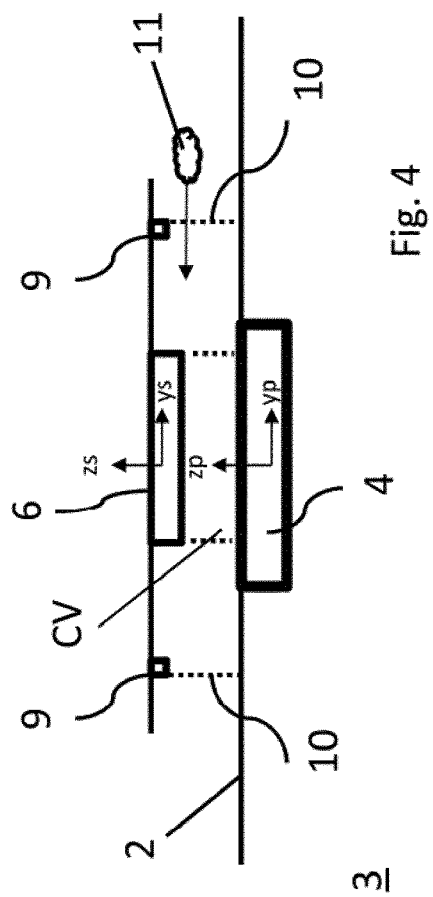

FIG. 3 shows a schematic front view of the vehicle 1 shown in FIG. 1. Shown are side detectors 9 which arranged on a bottom side 5 of the vehicle 1. FIG. 4 shows detection volumes 10 of the side detectors 9 which extend from the vehicle 1, in particular the chassis, to the surface 2 of the route 3.

FIG. 3 and FIG. 4 show that the side detectors 9 are arranged beside the charging volume CV. Moreover, the side detectors 9 are arranged beside the receiving device 2 and the primary unit 1. A distance of the side detectors 9 and an origin of each of the coordinate systems shown in FIG. 4 can be chosen depending on a lateral parking tolerance of the vehicle 1 with respect to the primary unit 4. Again shown is a foreign metal object 11 which moves into the direction of the charging volume CV from the side. During the indicated movement, the metal object 11 will pass the detection volume 10 of a side detector 9. Hence, an incoming metal object 11 can be detected and a charging control system can be informed. As seen from the FIG. 1 to FIG. 4, the detection volumes 10 of the front, rear and side detectors border or enclose an inner volume which comprises the charging volume CV but is larger than the charging volume CV. With the shown arrangement, foreign metal objects 11 entering the inner volume and thus potentially entering the charging volume CV can be reliably detected.

Figure 5:
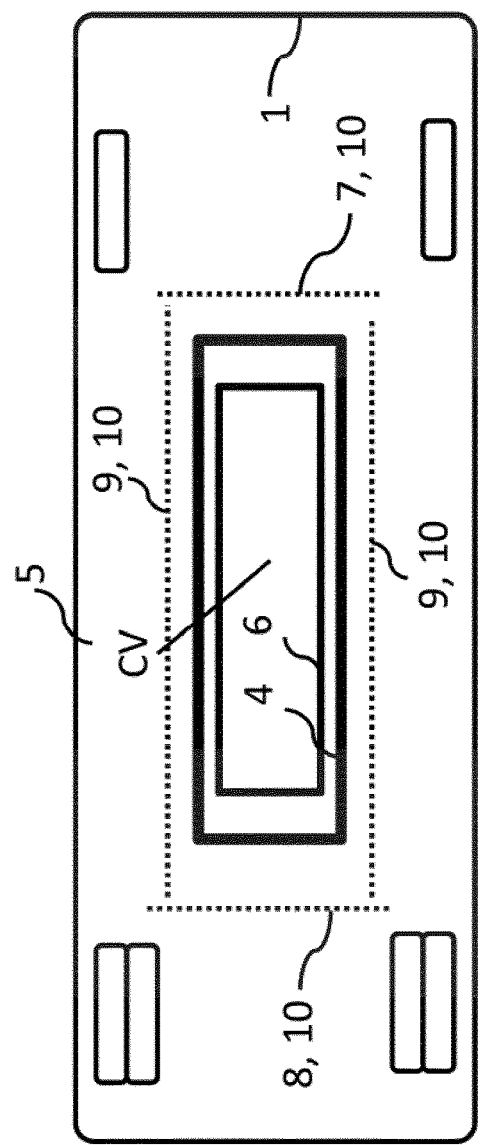

FIG. 5 shows a bottom view of the vehicle shown in FIG. 1. Shown is the primary unit 4, the receiving device 6 and the charging volume CV. Further shown are the front, rear and side detectors 7, 8, 9 and the corresponding detection volumes 10 by dotted lines. It can be seen that the inner volume bordered by detection volumes 10 comprises the charging volume CV but also volume portions beside the charging volume CV.

The detectors, 7, 8, 9 can be activated before and during inductive power transfer is performed. If a foreign metal object 11 (see e.g. FIG. 2) enters the inner volume and before the metal object 11 enters the charging volume CV, the inductive power transfer may be terminated or derated. Thus, the risk of interaction of the alternating electromagnetic field for inductive power transfer and the foreign object 11 is minimized, which, in turn, provides a higher operational safety.

Figure 6:
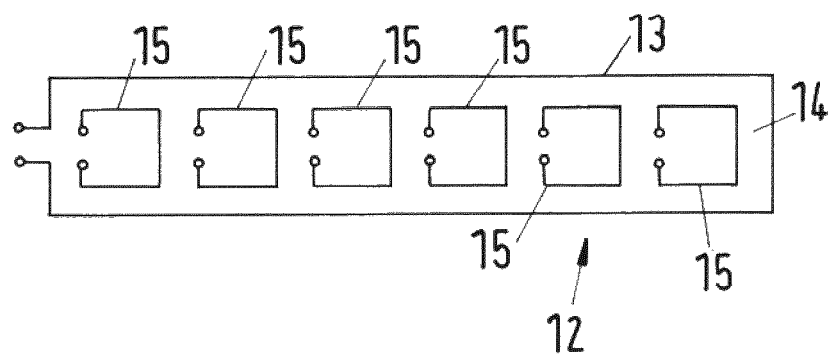

FIG. 6 shows a schematic block diagram of a sensing device 12 according to the invention. The detectors 7, 8, 9 shown in FIG. 1 to FIG. 5 can be designed as the sensing device 12 or similar to the line sensing device 12 shown in FIG. 6.

The sensing device 12 comprises a rectangular-shaped exciter coil 13. The exciter coil 13 encloses an inner volume or inner area 14. Within this inner volume or inner area 14, multiple, in particular six detection coils 15 are arranged. These detection coils 15 each have a rectangular shape. Further shown are terminals of the exciter coil 13 and the detection coils 15. For detecting metal objects, an AC current is applied to the terminals of the exciter coil 13. The AC current can have different frequencies along a time course of the AC current. The detection field generated by the exciter coil 13 due to the AC current will be received by the detection coils 15. The corresponding, induced voltage is measured at the terminals of the detection coils 15 and at least one signal characteristic, in particular a time characteristic, of the induced voltage is determined. Depending on the signal characteristic, the presence of a metal object 11 within the detection volume 10, an estimated size and an estimated type, e.g. material of the metal object 11 can be determined. The at least one signal characteristic can e.g. depend on the size and type of the detected object. This also allows discriminating between a foreign metal object 11 and the primary winding structure which is also made of metal, in particular made of copper.

Figure 7:
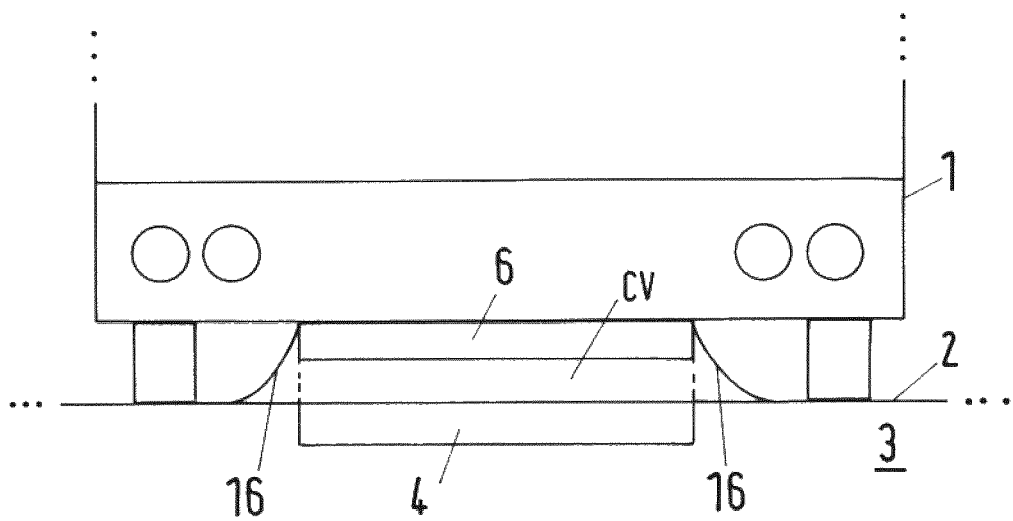

FIG. 7 shows another front view of a vehicle 1 with a receiving device 6 arranged on a surface 2 of a route 3 with a primary unit 4. In contrast to the vehicle 1 shown in FIG. 3, the vehicle shown in FIG. 7 comprises barrier elements 16 which are attached to the receiving device 6. The barrier elements 16 can e.g. be provided by rubber mats or plastic mats and are attached to lateral sides of the receiving device 6. The barrier elements 16 extend from the vehicle 1, in particular from the receiving device 6, towards the surface 2. It is shown that the air gap between the receiving device 6 and the primary unit 4 is completely covered by the barrier elements 16. By using the barrier elements 16, a foreign object 11 (see e.g. FIG. 4) can be physically prevented from entering the charging volume CV.

Figure 8:
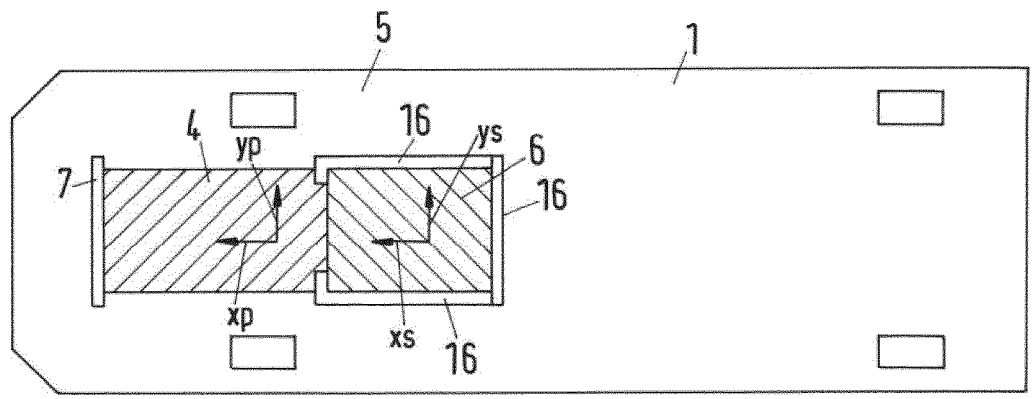

FIG. 8 shows a bottom view of the vehicle shown in FIG. 7. Shown is a front detector 7 and the receiving device 6, wherein barrier elements 16 as shown in FIG. 7 are arranged on lateral sides of receiving device 6 and on the rear side of the receiving device 6. However, no barrier element 16 is arranged on the front side of the receiving device 6. Further shown is a secondary-sided reference coordinate system. A front detector 7 is arranged on a bottom side 5 of the vehicle 1. It is shown that the front detector 7 is arranged with a predetermined distance along the longitudinal direction xs from the front side of the receiving device 6.

Further shown is a primary unit 4 projected onto the bottom side 5 of the vehicle 1 and a primary-sided reference coordinate system. The distance between the front detector 7 and the front side of the receiving device 6 is chosen such that when the vehicle 1 moves over the primary unit 4 in a longitudinal direction xp in order to reach an aligned state for inductive power transfer, the front detector 7 is moved over whole primary unit 4 before such an aligned state is reached. If the front detector 7 is activated during the described movement, the primary unit, in particular an active area of the primary unit, will be scanned by the detection volume 10 (see FIG. 2).

Thus, a two step method can be performed using the front detector 7. In a first step, the front detector 7 is activated during an alignment operation, e.g. if the vehicles 1 moves over the primary unit 4. In this step, the surface 2 of the route 3 (see FIG. 7) is scanned by the front detector 7. If a foreign object 11 is detected by the front detector 7 in the first step, a charging control system can be informed and the intended inductive power transfer will not be cleared or approved. Further, a safety unit or even the driver of the vehicle 1 can be notified that a foreign object 11 is located in the charging volume CV or at least close to the charging volume CV. If no object 11 has been detected in the first step, the inductive power transfer may be initiated.

During said movement, a part of the primary winding structure can be detected by the front detector 7, wherein said primary winding structure and a foreign metal object 11 can be discriminated based on at least one signal characteristic of the output signal of the front detector 7. In particular, at least one signal characteristic of an output signal which is generated due to a part of the primary winding structure within the detection volume can be a predetermined signal characteristic, which is e.g. determined by a preliminary test or calibration. If a deviation of a detected signal characteristic from the predetermined signal characteristic is larger than a predetermined measure, e.g. a predetermined threshold value, a metal foreign object 11 can be detected. This also allows to discriminate between a foreign metal object 11 and the primary winding structure if the metal object 11 is located directly above a part of the primary winding structure. As the primary winding structure can be made of copper, especially metal objects which are not made of copper can be reliably detected.

Before and during said inductive power transfer, the front detector 7 and, if applicable, the rear and side detectors 8, 9, can be activated. If, during inductive power transfer, a foreign object 11 enters the inner volume, in particular the charging volume CV, it will be detected by one of the activated detectors 7, 8, 9. Then, the charging control system can be informed and the ongoing inductive power transfer will be terminated or derated. Further, a safety unit or even the driver of the vehicle 1 can be notified that a foreign object 11 has entered the charging volume CV or a volume close to the charging volume CV.

Figure 9:
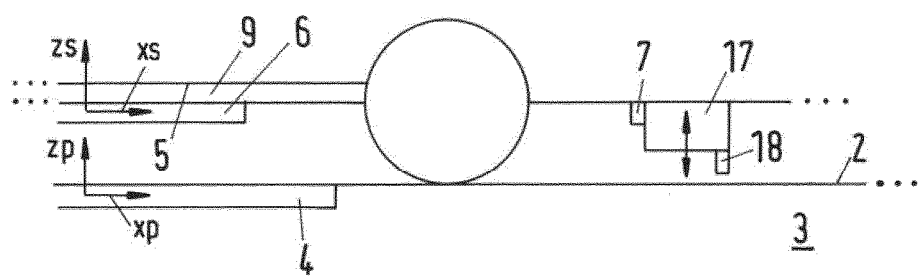

FIG. 9 shows a schematic side view of another vehicle 1. I contrast to the embodiment shown in FIG. 1 the front detector 7 is attached to a positioning device 17 which is movable into and against a vertical direction zs of the secondary-sided reference coordinate system. Also attached to the positioning device 17 is a cleaning device 18, e.g. a broom-like device or a squeegee-like device. At the beginning of an alignment operation, e.g. before the front detector 7 is positioned over the active area or an active zone comprising the active area, the positioning device 17 can be lowered until the cleaning device contacts the surface 2 of the route 3. During the alignment operation, the active area will be cleaned by the cleaning device 18 and foreign objects 11 (see e.g. FIG. 2) will be physically removed. Remaining foreign objects 11, however, can be detected by the front detector 7. As the front detector 7 is moved closer to the surface 2, a detection sensitivity can also be improved since foreign objects 11 located on the surface 2 will also be located closer to the front detector 5.

The invention claimed is:

1. An inductive power transfer system comprising:
   an object detection system comprising at least one sensing device;
   a primary winding structure; and
   a secondary winding structure,
   wherein a charging volume is assigned to the inductive power transfer system,
   wherein the at least one sensing device has a detection volume, wherein the at least one sensing device is arranged such that the detection volume is fully arranged outside the charging volume or comprises only an edge portion of the charging volume,
   wherein the at least one sensing device comprises at least one exciting winding structure and at least one detecting winding structure, wherein the at least one detecting winding structure is arranged within the exciting winding structure, wherein an electromagnetic detection field is generable by the exciting winding structure.

2. The inductive power transfer system according to claim 1, wherein the at least one sensing device is designed as an inductive sensing system.

3. The inductive power transfer system according to claim 1, wherein the at least one sensing device is arranged ahead of the charging volume or at a front edge region of the charging volume with respect to a coordinate system comprising a vertical axis, a longitudinal axis and a lateral axis, wherein the longitudinal axis is oriented parallel to a longitudinal axis of the primary winding structure or parallel to a longitudinal axis of the secondary winding structure.

4. The inductive power transfer system according to claim 1, wherein the object detection system comprises at least another sensing device, wherein the at least another sensing device is arranged beside the charging volume or at a lateral edge region of the charging volume, behind the charging volume, or at a rear edge region of the charging volume with respect to a coordinate system comprising a vertical axis, a longitudinal axis and a lateral axis, wherein the vertical axis is oriented parallel to a main direction of propagation of the alternating electromagnetic field generated by the primary winding structure or orthogonal to a plane comprising a secondary winding structure or a bottom surface of the secondary winding structure, wherein the longitudinal axis is oriented parallel to a longitudinal axis of the primary winding structure or parallel to a longitudinal axis of the secondary winding structure, wherein the lateral axis is oriented orthogonal to the vertical axis and the longitudinal axis.

5. The inductive power transfer system according to claim 1, wherein the at least one sensing device is arranged ahead of the charging volume or at a front edge region of the charging volume with respect to a coordinate system comprising a vertical axis, a longitudinal axis and a lateral axis, wherein the vertical axis is oriented parallel to a main direction of propagation of the alternating electromagnetic field generated by the primary winding structure or orthogonal to a plane comprising a secondary winding structure or a bottom surface of the secondary winding structure, wherein the longitudinal axis is oriented parallel to a longitudinal axis of the primary winding structure or parallel to a longitudinal axis of the secondary winding structure, wherein the lateral axis is oriented orthogonal to the vertical axis and the longitudinal axis,
   wherein the object detection system comprises at least one other sensing device,
   wherein the at least one other sensing device is arranged beside the charging volume, at a lateral edge region of the charging volume, behind the charging volume, or at a rear edge region of the charging volume with respect to the coordinate system.

6. The inductive power transfer system according to claim 1, wherein at least one barrier device is arranged beside the charging volume or behind the charging volume with respect to a coordinate system comprising a vertical axis, a longitudinal axis, and a lateral axis, wherein the longitudinal axis is oriented parallel to a longitudinal axis of the primary winding structure or parallel to a longitudinal axis of the secondary winding structure.

7. The inductive power transfer system according to claim 1, wherein the at least one sensing device is arranged on a secondary side of the inductive power transfer system or on a primary side of the inductive power transfer system.

8. The inductive power transfer system according to claim 4, wherein the at least one other sensing device is arranged on a secondary side of the inductive power transfer system or on a primary side of the inductive power transfer system.

9. The inductive power transfer system according to claim 4, wherein the at least one sensing device is arranged on a secondary side of the inductive power transfer system or on a primary side of the inductive power transfer system, wherein the at least one other sensing device is arranged on a secondary side of the inductive power transfer system or on a primary side of the inductive power transfer system.

10. The inductive power transfer system according to claim 1, wherein the object detection system comprises at least one positioning means for adapting a position of the at least one sensing device.

11. The inductive power transfer system according to claim 4, wherein the object detection system comprises at least one positioning means for adapting a position of the at least one other sensing device.

12. The inductive power transfer system according to claim 4, wherein the object detection system comprises at least one positioning means for adapting a position of the at least one sensing device, wherein the object detection system comprises at least one positioning means for adapting a position of the at least one other sensing device.

13. The inductive power transfer system according to claim 1, wherein the object detection system comprises at least one evaluation unit, wherein at least one signal characteristic of an output signal of the at least one sensing device is determinable by the at least one evaluation unit, wherein at least one characteristic of a detected object is determinable depending on the at least one signal characteristic.

14. A method for detecting a foreign object in an inductive power transfer system, wherein the inductive power transfer system comprises a primary winding structure and a secondary winding structure, wherein an object detection system comprises at least one sensing device, wherein the at least one sensing device has a detection volume, the method comprising:
assigning a charging volume to the inductive power transfer system;
arranging the at least one sensing device such that the detection volume is fully arranged outside the charging volume or comprises only an edge portion of the charging volume; and
activating the at least one sensing device before and/or during an inductive power transfer,
wherein the at least one sensing device comprises at least one exciting winding structure and at least one detecting winding structure, wherein the at least one detecting winding structure is arranged within the exciting winding structure, wherein an electromagnetic detection field is generated by the exciting winding structure.

15. The method according to claim 14, the method further comprising activating the at least one sensing device during an alignment operation of the secondary winding structure relative to the primary winding structure.

16. The method according to claim 15, the method further comprising arranging the at least one sensing device ahead of the charging volume or at a front edge region of the charging volume; and activating the at least one sensing device before and during the secondary winding structure is moved over the primary winding structure in a predetermined direction.

17. The method according to claim 14, the method further comprising activating the at least one sensing device ahead of the charging volume or at a front edge region of the charging volume and/or the at least one other sensing device beside or behind the charging volume or at a lateral edge region or at a rear edge region of the charging volume after the secondary winding structure is aligned relative to the primary winding structure and before and/or during an inductive power transfer.

18. The method according to claim 14, the method further comprising adjusting a vertical position of the at least one sensing device.

19. The method according to claim 14, the method further comprising generating a detection signal in response to if a foreign object being detected by the at least one sensing device, wherein the inductive power transfer process is controlled depending on the detection signal.

20. The method according to claim 14, the method further comprising determining at least one signal characteristic of an output signal of the at least one sensing device, wherein at least one characteristic of a detected object is determined depending on the at least one signal characteristic.

21. A vehicle comprising:
an object detection system, comprising at least one sensing device, wherein the sensing device has a detection volume, wherein the at least one sensing device is arranged such that the detection volume is fully arranged outside a charging volume or comprises only an edge portion of the charging volume, wherein the at least one sensing device comprises at least one exciting winding structure and at least one detecting winding structure, wherein the at least one detecting winding structure is arranged within the exciting winding structure, wherein an electromagnetic detection field is generable by the exciting winding structure.

* * * * *